United States Patent
Lim et al.

(10) Patent No.: US 9,749,579 B2
(45) Date of Patent: Aug. 29, 2017

(54) APPARATUS AND METHOD FOR FRAME RATE CONVERSION

(71) Applicant: SAMSUNG ELECTRONICS CO., LTD., Suwon-si (KR)

(72) Inventors: Hyung-jun Lim, Seoul (KR); Seong-hoon Choi, Yongin-si (KR); Ho-cheon Wey, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/194,737

(22) Filed: Jun. 28, 2016

(65) Prior Publication Data
US 2017/0187985 A1   Jun. 29, 2017

(30) Foreign Application Priority Data

Dec. 24, 2015 (KR) .................. 10-2015-0186479

(51) Int. Cl.
*H04N 7/01*   (2006.01)

(52) U.S. Cl.
CPC ........... *H04N 7/014* (2013.01); *H04N 7/0125* (2013.01); *H04N 7/0127* (2013.01)

(58) Field of Classification Search
CPC ..... H04N 7/014; H04N 7/0125; H04N 7/0127
See application file for complete search history.

(56) References Cited

U.S. PATENT DOCUMENTS

| | | | | |
|---|---|---|---|---|
| 2003/0081675 | A1* | 5/2003 | Sadeh | H04N 19/533 375/240.03 |
| 2004/0174459 | A1* | 9/2004 | Holt | G06T 7/0081 348/452 |
| 2008/0043842 | A1* | 2/2008 | Nakaishi | H04N 19/119 375/240.16 |
| 2008/0043843 | A1* | 2/2008 | Nakaishi | H04N 19/176 375/240.16 |
| 2012/0195381 | A1* | 8/2012 | Watanabe | H04N 19/105 375/240.15 |
| 2013/0028326 | A1* | 1/2013 | Moriya | H04N 19/176 375/240.16 |
| 2013/0114700 | A1* | 5/2013 | Moriya | H04N 19/105 375/240.03 |

* cited by examiner

*Primary Examiner* — Michael Teitelbaum
(74) *Attorney, Agent, or Firm* — Sughrue Mion, PLLC

(57) ABSTRACT

A frame rate conversion apparatus includes a memory to store a plurality of frames forming an input image, the plurality of frames including a current frame which includes a plurality of areas; and a processor configured to generate an interpolation frame by performing, with respect to an object area, an interpolation which is different from the interpolation applied to other areas, of the plurality of areas, the object area being an area which includes an object and in which at least one among a size, a speed, and a shape of the object satisfies a certain condition, and to insert the interpolation frame between the current frame and an adjacent frame.

20 Claims, 13 Drawing Sheets

APPARATUS AND METHOD FOR FRAME RATE CONVERSION

CROSS-REFERENCE TO RELATED APPLICATION

This application claims priority from Korean Patent Application No. 10-2015-0186479, filed on Dec. 24, 2015, in the Korean Intellectual Property Office, the disclosure of which is incorporated herein by reference in its entirety.

BACKGROUND

1. Field

Apparatuses and methods consistent with exemplary embodiments relate to a frame rate conversion, and more particularly, to performing a frame rate conversion by using a motion estimation.

2. Description of the Related Art

The development of electronic technologies has brought the development of technologies for realizing high-definition and high-quality images in display apparatuses.

As a result of the development of the above-mentioned technologies, broadcasting services having Full High Definitions (FHD) and broadcasting services having Ultra High Definition (UHD) 4 times High Definition Televisions (HDTVs) have been recently provided.

As display apparatuses are made large, and image outputting methods are changed, it has been difficult to reproduce realistic images with only the frames of video images received by the display apparatuses. For example, there occurs a motion blur phenomenon where a quickly moving object is blurredly displayed.

In order to solve this problem, a technology that interpolates the frames, to increase the number of frames of the video image per second has been actively studied.

However, a decline in image quality may occur in an interpolated frame due to characteristics of individual area included in an image frame.

Therefore, there is a need for more accurately interpolating an interpolation frame in consideration of the characteristics of individual areas of a frame in a generation of an interpolation frame.

SUMMARY

Exemplary embodiments may address at least the above problems and/or disadvantages and other disadvantages not described above. Also, exemplary embodiments are not required to overcome the disadvantages described above, and may not overcome any of the problems described above.

One or more exemplary embodiments provide an apparatus and a method for performing a motion estimation based on characteristics of an object included in an image frame to perform a frame rate conversion.

According to an aspect of an exemplary embodiment, a frame rate conversion apparatus includes a memory configured to store a plurality of frames forming an input image; and a processor configured to, by applying an interpolation which is different from the interpolation applied to an object area in which at least one of a size, speed, and a shape of an object included in a current frame among the plurality of frames satisfies a preset condition, generate an interpolation frame which is inserted between the current frame and an adjacent frame.

The processor may perform, with respect to an object area of which size is smaller than a preset size, the interpolation by setting such that a block size for movement estimation is less than a preset size.

The processor, when a movement of the object is greater than a preset speed, in the adjacent frame, may set such that a search area of a motion vector with respect to a block of the set object is greater than a preset area and performs the interpolating.

When a size of the object is less than a preset size, the interpolating may be performed by setting strength of filtering to equalize a motion vector of a block of the set object to be less than a preset strength.

The processor, with respect to an object area where the object is in a pattern shape, may perform the interpolating by setting such that a size of a block which is a unit performing interpolating is to be greater than a preset size.

The processor, based at least on one of a direction of an edge included in the current frame or whether an edge is repeated, may determine whether the object is in a pattern shape.

When the object is in a pattern shape, the processor may perform the interpolating by setting strength of filtering to equalize a motion vector of a block of the set object to be greater than a preset strength.

The processor, in the adjacent frame, may set such that a search area of a motion vector with respect to a block of the set object is less than a preset area and performs the interpolating.

The processor may perform the interpolating by determining whether estimation of a movement of the object inserted in a video constituting the current frame is available.

The processor may perform the interpolating based at least on one of a representative value of the object, a size of the object, a speed of the object, and a shape of the object.

According to an exemplary embodiment, a frame rate conversion method includes storing a plurality of frames forming an input image; applying, to an object area of which at least one of a size, speed, and shape of an object included in a current frame among the plurality of frames, interpolating which is different from the interpolating applied to the rest of the areas; and generating an interpolation frame which is inserted between the current frame and an adjacent frame.

The interpolating, with respect to an object area of which a size of the object is less than a preset size, may be performed by setting that a size of a block for estimating a movement is to be less than a preset size.

The interpolating may be performed, when a movement of the object is greater than a preset speed, in the adjacent frame, by setting that a search area of a motion vector with respect to a block of the set object is to be greater than a preset area.

The interpolating may be performed, when a size of the object is less than a preset size, by setting strength of filtering to equalize a motion vector of a block of the object to be less than a preset strength.

The interpolating may be performed, with respect to an object area where the object is in a pattern shape, by setting such that a size of a block which is a unit performing interpolating is to be greater than a preset size.

The method further includes determining, based at least on one of a direction of an edge included in the current frame or whether an edge is repeated, whether the object is in a pattern shape.

The interpolating may include, when the object is in a pattern shape, interpolating by setting strength of filtering to equalize a motion vector of a block of the set object to be greater than a preset strength.

The interpolating may include, in the adjacent frame, interpolating by setting such that a search area of a motion vector with respect to a block of the set object is less than a preset area.

The interpolating may include performing the interpolating by determining whether estimation of a movement of the object inserted in a video constituting the current frame is available.

The interpolating may include performing the interpolating based at least on one of a representative value of the object, a size of the object, speed of the object, and a shape of the object.

BRIEF DESCRIPTION OF THE DRAWINGS

The above and/or other aspects will become more apparent by describing certain exemplary embodiments with reference to the accompanying drawings, in which.

DETAILED DESCRIPTION OF EXEMPLARY EMBODIMENTS

Figure 1:
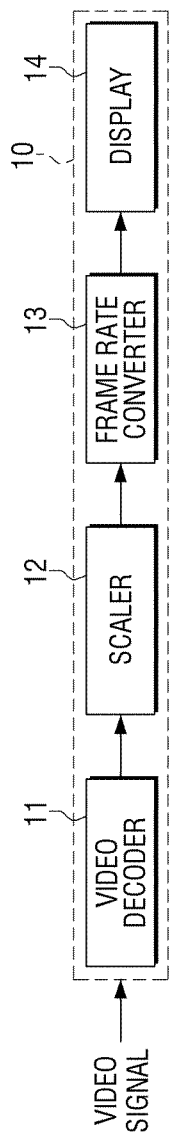
FIG. 1 is a block diagram illustrating a video processing process of a display apparatus according to an exemplary embodiment.

Certain exemplary embodiments will be described in greater detail with reference to the accompanying drawings.

In the following description, like drawing reference numerals are used for like elements, even in different drawings. The matters defined in the description, such as detailed construction and elements, are provided to assist in a comprehensive understanding of the exemplary embodiments. However, it is apparent that the exemplary embodiments can be practiced without those specifically defined matters. Also, well-known functions or constructions are not described in detail since they would obscure the description with unnecessary detail.

General terms are selected as the terms used in the specification and claims in consideration of functions of various exemplary embodiments. However, these terms may vary according to intentions of those skilled in the art or legal or technical interpretations and emergencies of new technologies. Also, some terms are arbitrarily selected by an applicant. These terms may be interpreted as a meaning defined in the present specification. If there is no detailed term definition, the terms may be interpreted based on overall contents of the present specification and normal technical common senses of the art.

Although elements having the same reference numerals are all illustrated in a plurality of drawings, the plurality of drawings do not mean one exemplary embodiment.

Also, the terms "first", "second", etc. may be used to describe diverse components, but the components are not limited by the terms. The terms are only used to distinguish one component from the others. For example, used orders, arrangement orders, or the like of elements that are combined with these ordinal numbers may not be limited by the numbers. If necessary, the ordinal numbers may be respectively replaced and used.

The singular expression also includes the plural meaning as long as it does not differently mean in the context. In the present application, the terms "include" and "comprise" designate the presence of features, numbers, steps, operations, components, elements, or a combination thereof that are written in the specification, but do not exclude the presence or possibility of addition of one or more other features, numbers, steps, operations, components, elements, or a combination thereof.

In the exemplary embodiments, a "module" or a "unit" performs at least one function or operation, and may be implemented with hardware, software, or a combination of hardware and software. In addition, a plurality of "modules" or a plurality of "units" may be integrated into at least one module except for a "module" or a "unit" which has to be implemented with specific hardware, and may be implemented with at least one processor (not shown).

Also, when any part is connected to another part, this includes a direct connection and an indirect connection through another medium. Unless otherwise defined, when any part includes any element, it may mean that any part further include other elements without excluding other elements.

If it is determined that detailed descriptions of related well-known functions or elements unnecessarily make the scope of the present invention unclear, their detailed descriptions are abbreviated or omitted.

FIG. 1 is a block diagram illustrating a video processing process of a display apparatus 10 according to an exemplary embodiment.

Referring to FIG. 1, a video signal is processed sequentially through a video decoder 11, a scaler 12, a frame rate converter (FRC) 13, and a display 14.

The video decoder 11 decodes the video signal. Therefore, a decompressed video signal is output from the video decoder 11.

The scaler 12 scales a size of a video of the decoded video signal output from the video decoder 11 to a size appropriate for the display 14 provided in the display apparatus 10.

The FRC 13 performs a frame rate conversion with respect to the video scaled by the scaler 12. For example, if a video frame rate transmitted from the scaler 12 is 60 Hz, the FRC 13 may convert a frame rate of the video into 120 Hz. Here, an interpolation frame may be inserted between a plurality of frames forming an input image to perform the frame rate conversion. This will now be described with reference to FIG. 2.

Figure 2:
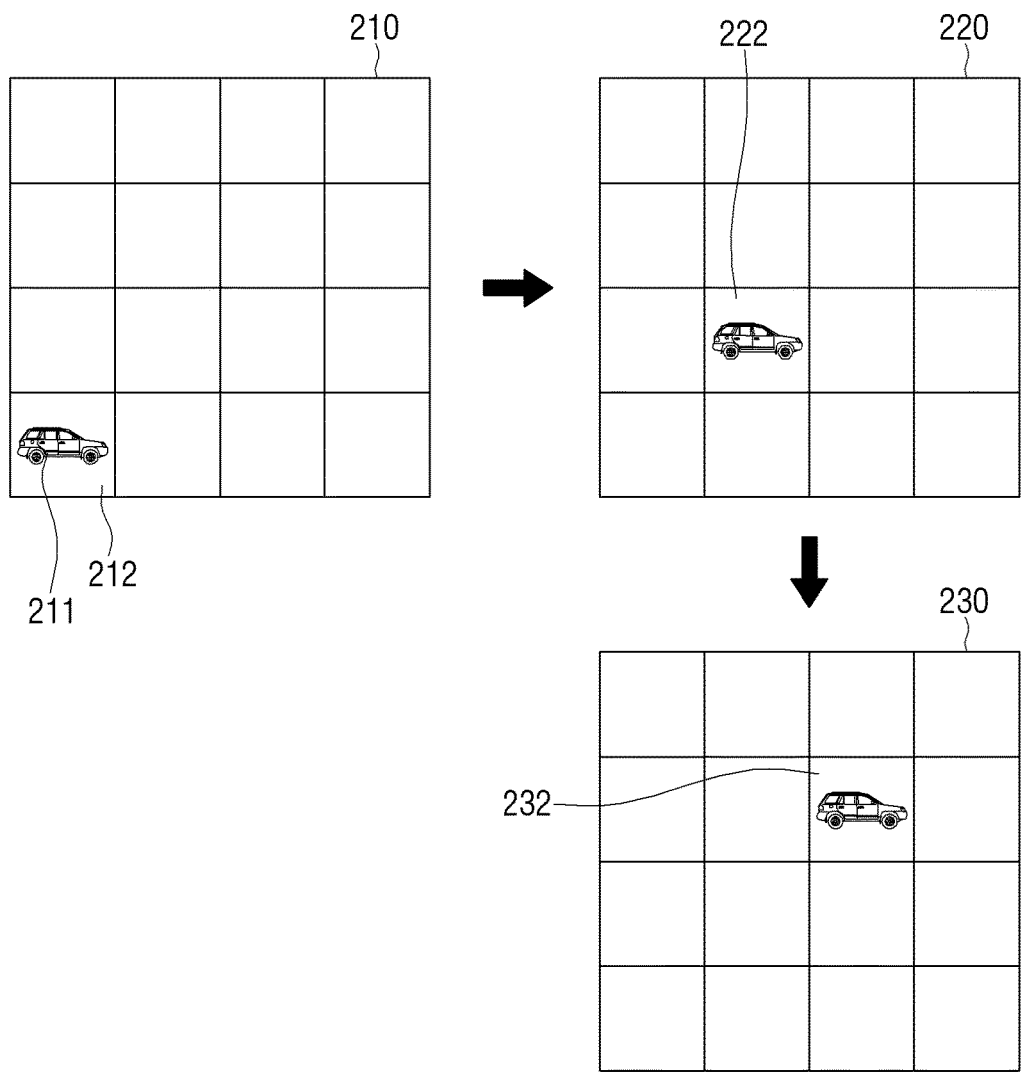
FIG. 2 illustrates a frame rate conversion according to an exemplary embodiment.

FIG. 2 illustrates a frame rate conversion according to an exemplary embodiment.

Referring to FIG. 2, reference numeral 230 may denote a current frame, and reference numeral 210 may denote a previous frame.

Referring to FIG. 2, a current frame 230 is in a state where a portion of the previous screen 210 is changed. For example, as FIG. 2, an automobile 211 is located in a first block 212 of the previous frame 210 and then located in a third block 232 of the current frame 230.

In this case, an interpolation frame 220 refers to an intermediate state before the current frame 230 is changed into the previous frame 210. Therefore, the automobile 211 is located in a middle 222 of the interpolation frame 210 between the first block 212 of the previous frame 210 and the third block 232 of the current frame 230. Therefore, the interpolation frame 220 corresponding to the intermediate state between a state of the previous frame 210 and a state of the current frame 230 may be generated to be inserted between the previous frame 210 and the current frame 230 so as to convert a frame rate. Here, if n interpolation frames are inserted between the previous frame 210 and the current frame 230, a frame rate increases n times.

Motion Estimation (ME) and/or Motion Compensation (MC) technologies may be applied to generate the interpolation frame 220. As described in the above example, if the ME and/or MC technologies are applied, the FRC 13 estimates an operation of an intermediate frame based on operations of a previous frame and a subsequent frame to generate and insert a compensated frame. Here, ME refers to an estimation of a motion or a displacement vector for locating a matching block of a reference frame in a current block. Also, MC is a process of actually arranging a block of a reference frame in a matching block of a current frame.

As described above, if the ME and/or MC technologies are applied, an image having a converted frame rate is expressed as a softer image. In particular, the ME will be described in detail with reference to FIG. 3.

The display 14 sequentially displays image frames output from the FRC 13.

Figure 3:
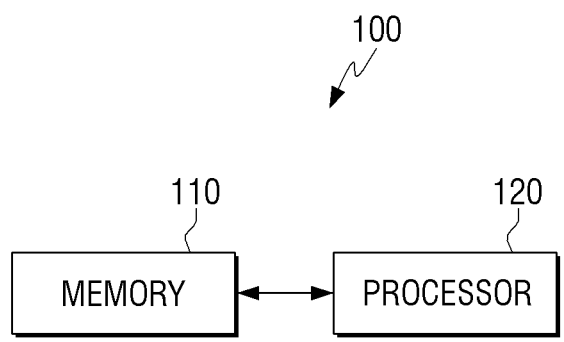
FIG. 3 is a block diagram of a configuration of a frame rate conversion apparatus according to an exemplary embodiment.

FIG. 3 is a block diagram of a configuration of a frame rate conversion apparatus 100 according to an exemplary embodiment.

Referring to FIG. 3, the frame rate conversion apparatus 100 includes a memory 110 and a processor 120.

The memory 110 stores data. In particular, the memory 110 may store a plurality of frames forming an input image. For example, the memory 110 may be a random access memory (RAM) but is not limited thereto.

The processor 120 controls an overall operation of the frame rate conversion apparatus 100.

The processor 120 estimates a motion vector to generate an interpolation frame. For this, the processor 120 performs block matching between a block of a current frame and adjacent frames. Here, through the block matching, when a block matched among the frames in adjacent to the current block frames is determined, based on a location difference between the matched blocks. This will now be described in detail with reference to FIGS. 4A and 4B.

Figure 4A:
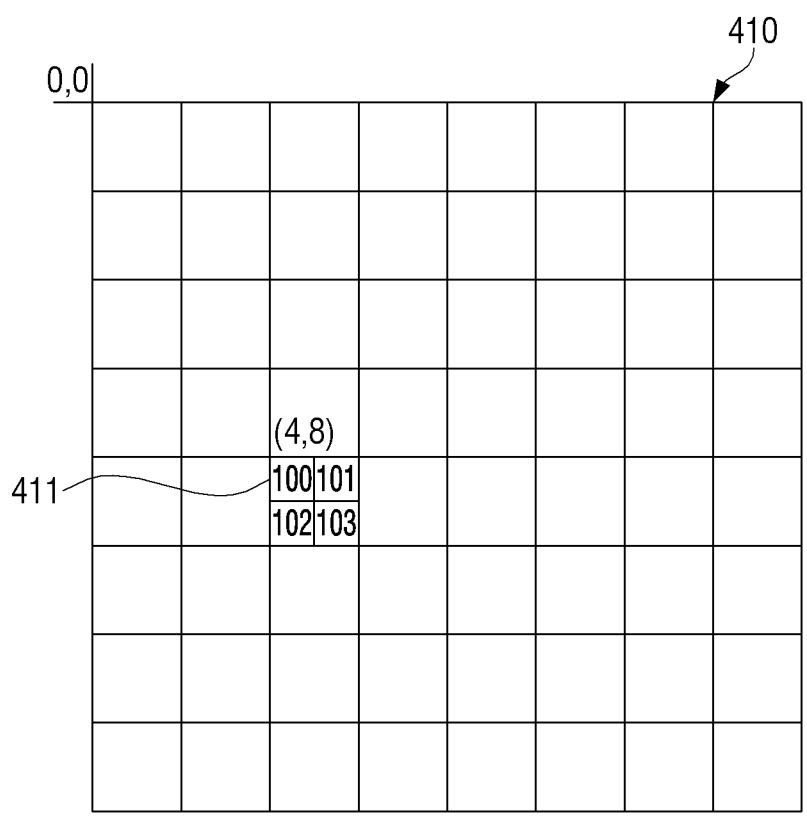
FIGS. 4A and 4B illustrate block matching according to an exemplary embodiment.
Figure 4B:
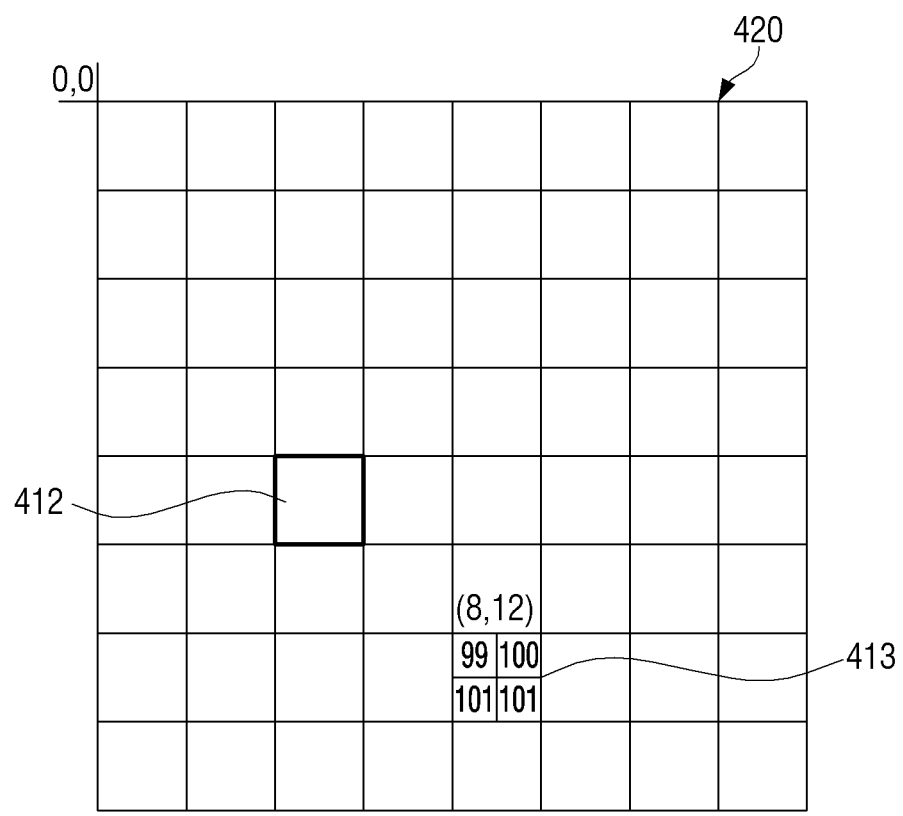

FIGS. 4A and 4B illustrate block matching according to an exemplary embodiment.

Hereinafter, block matching and motion estimation may be performed with respect to each block. Also, the block matching may be performed between a current frame 410 and a previous frame 420. Here, blocks refer to preset units forming a frame. For example, a block may be a square or a rectangle including a plurality of pixels or may be an arbitrary geometric shape. Also, a block is not limited to a data unit having a preset size.

FIG. 4A illustrates the current frame 410 according to an exemplary embodiment. The current frame 410 is one of a plurality of frames forming an input image. A block 411 of the current frame 410 includes 4 pixels respectively having pixel values.

The processor 120 may perform block matching within a preset range. For example, as shown in FIG. 4B, 4 pixels (within a square scope having coordinates of pixels (0, 4), (9, 4), (9, 13), (0, 13) as apexes that are located on upper, lower, left, and right sides from a block 412 of blocks of the previous frame 420 in the same location as the block 411 of the current frame 410 may be set to a range of block matching.

For example, for block matching, the processor 120 may calculate difference values between pixel values of a plurality of pixels forming the block 411 of the current frame 410 and pixel values of a plurality of pixels forming blocks of the previous frame 420 in the range of the block matching.

For example, as in FIGS. 4A and 4B, each of the pixel values of the plurality of pixels forming the block 411 of the current frame 410 are assumed to be 100, 101, 102, and 103 from a left top toward a clockwise direction, and pixel values of a plurality of pixels forming a block 413 (coordinates 8, 12) of the previous frame 420 that is a target of block matching are 99, 100, 101, and 101 from a left top toward a clockwise direction. Here, the processor 120 may calculate differences between pixel values and add an absolute value of the differences. In this case, a result value thereof is 5. This is defined as a block matching value. That is, the block matching value indicates a value which adds an absolute value of a difference between a pixel value of a plurality of pixels constituting the current frame block and a pixel value of a plurality of pixels constituting the adjacent frame of the current frame which is subject to block matching of the current frame.

In the meantime, the processor 120 performs block matching with respect to all blocks of a block matching range. As a result, the processor 120 determines a block 413 of the previous block 420 having the smallest block matching value as a block that matches with the block 411 of the current frame 410.

Also, the processor 120 may determine a motion vector of the block 411 of the current frame 410 by using the block 413 matching with the block 411 of the current frame 410 and a location (here, coordinate values) of the block 411 of the current frame 410. For example, the processor 120 may determine the motion vector of the block 411 of the current frame 410 as (4, 4) from coordinates (4, 8) of the block 411 of the current frame 410 and coordinates (8, 12) of the block 413 of the previous frame 430 matching with the coordinates (4, 8).

As such, the processor 120 may estimate a motion vector of a block of the current frame based on the above method.

In the meantime, the processor 120, in case of a predetermined area included in a current frame, may estimate a movement using a method different from the method applied to the areas other than the predetermined area of the current frame.

Below, for easier description, a size (that is, a size of an object included in a current frame) of a predetermined area of a current frame as the number of pixels in width and height. For example, when a size of a predetermined area of the current frame is N pixels in width and height, a size of a predetermined area of the current frame can be defined as N.

For example, the processor 120 applies interpolating which is different from the interpolating for other areas, for an object area which satisfies at least one of preset conditions such as a size, speed, and shape of the object included in the current frame, among a plurality of frames, and generates an interpolation frame which is inserted between the present frame and the adjacent frame. Here, the object area may be an area which includes an object in the current frame.

First of all, the processor 120, when a size of an object included in the current frame is less than a preset size, may set such that size of a block for estimating a movement is to be less than a preset size and perform interpolating with respect to the object area including the object.

Here, a preset size of a block for estimating a movement is a size of a block applied to a video frame when performing block matching, and may be preset. For example, in case of FIG. 4A, a preset size can be 2.

In other words, the processor 120, when a size of an object included in the current frame is less than a preset size, may perform block matching for an object area including the object with a size which is smaller than a size of the block applied to the areas other than the object area for block matching.

For example, as illustrated in FIG. 4A, it is assumed that a size of a block for estimating a movement is 2×2. In this case, the processor 120, when a size of the object is less than a preset size, may perform block matching for the object area by using a block having a size of, for example 1×1, which is smaller than 2×2.

In this case, a size of a block applied to the object area may be preset or may be determined adaptively according to sizes of objects.

For example, the processor 120, when the object has a size of 1×1, may perform block matching for the object area by using a block having a size of 1×1 which is the same as the object.

In the meantime, for block matching with respect to an object area including an object, whether or not to perform block matching using blocks having a size less than that of other areas can be determined according to a size of an object.

That is, as described above, the processor 120, when an object has a size which is smaller than a preset size, may perform block matching using a block of a size less than that of other areas.

Herein, the preset size is a preset value in a system, and the size can be determined based on probability that block matching error may occur.

For example, when a size of an object is small, if block matching is performed regarding an object area including an object with a block having a size which is the same as that of other areas, ratio of the object within a block is comparatively small. Thus, it may be comparatively high that block matching error may occur due to influence by the areas other than the object in the block.

Accordingly, in order to minimize probability of error occurrence according to sizes of objects and sizes used for block matching, for objects having a size less than a preset size in consideration of a size of a block, block matching can be performed using a block of a size smaller than that of other areas.

Below, with reference to FIGS. 5A and 5B, a block matching method according to a size of objects will be described in a greater detail.

Figure 5A:
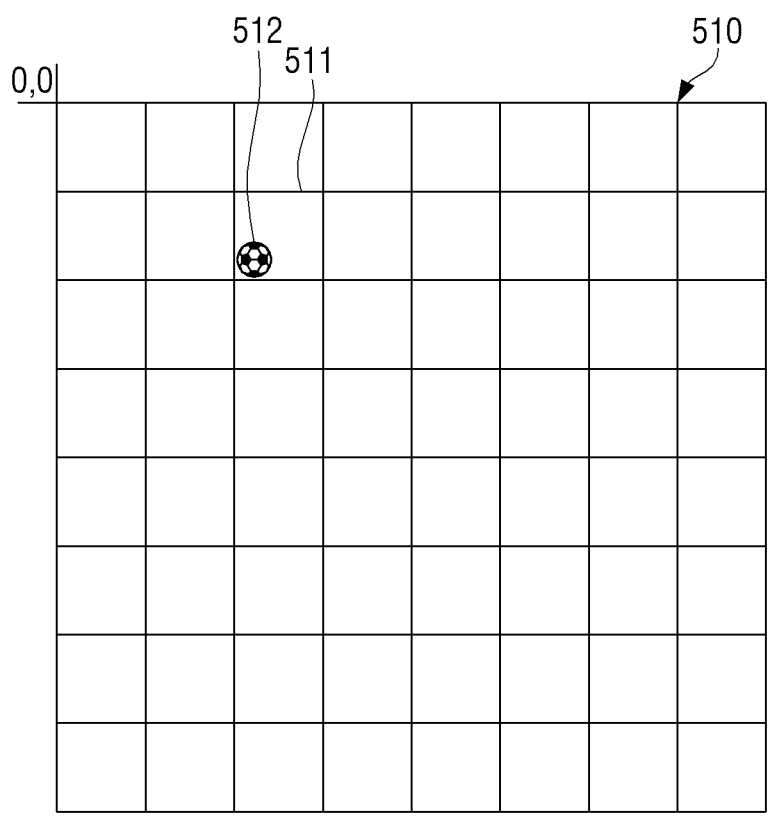
FIGS. 5A and 5B illustrate interpolate process, according to an exemplary embodiment.
Figure 5B:
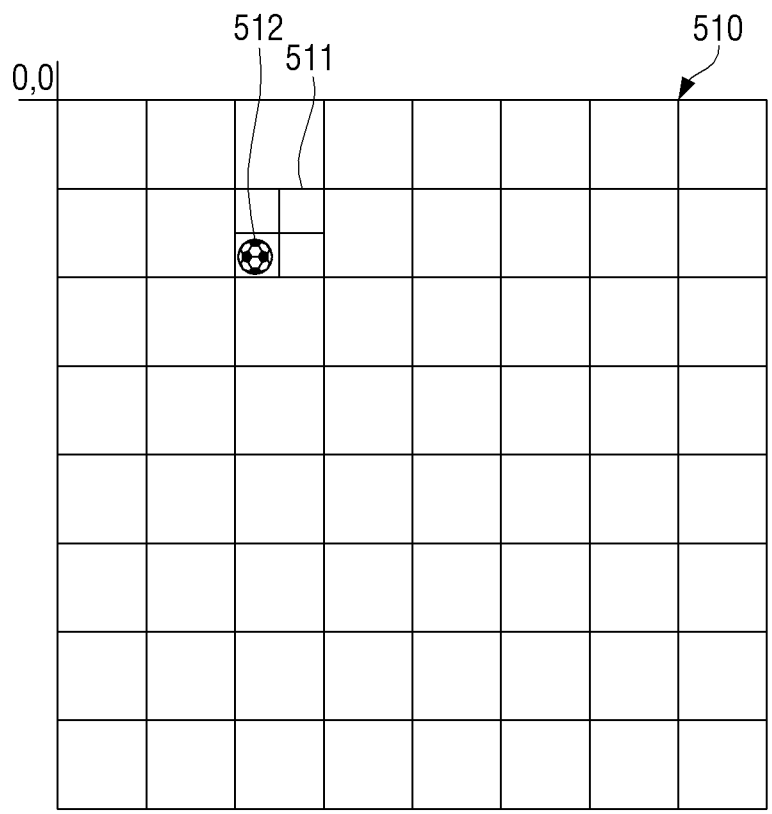

FIGS. 5A and 5B are views to describe interpolating according to an exemplary embodiment.

In FIG. 5A, it is assumed that sizes of each block of the current frame 510 which are set for estimating a movement is 100)r. In addition, in the current frame 510, it is assumed that a size of the object 512 is 5×2. Also, it is assumed that, a size of a preset object to set that a size of a block for estimating a movement is to be less than a preset size is 5×5.

FIG. 5B, as illustrated in FIG. 5A, when a size of blocks of the current frame 510 for motion estimation is 10×10, is a view to describe a process of resetting a set size for motion estimation of the block 511 including the object 512 according to a size of the object 512.

Referring to FIG. 5B, if it is determined that the size of the object (512) contained in the current frame is set to be smaller than the present size which is a reference for setting a size of a block for block estimation to be less than a preset size, the processor 120 may reset the size of a block for motion estimation as 5×5. In this case, the processor 120, in the motion estimation to generate an interpolation frame, performs motion estimation to set the size of the block to 5.

As described above, by performing block matching by adjusting the block size for performing motion estimation in accordance with the size of the object, the accurate motion estimation can be carried out even for small-sized object. On the other hand, the processor 120, if the movement of the object is equal to or greater than already set speed, may perform interpolating, in the adjacent frames, by setting a search area of the motion vector of the block of the set object to be greater than a predetermined area. Here, the block of the object is a block that contains the whole or a part of the object.

Here, the preset area for searching a motion vector is the block matching area that is applied to a video frame when performing the block matching and which may have been preset. That is, the preset area for searching a motion vector may be a size of a typical block matching area which is set in advance. For example, in case of FIG. 4B, a size of the preset area may be 10×10.

That is, the processor 120, when a motion of the object included in the current frame is greater than the preset speed, may perform block matching for an area which includes the corresponding object having a size greater than a size of the typically applied block matching area.

For example, it is assumed that the search area of the motion vector is 10×10. In this case, the processor 120, when the motion speed of the object is already set speed or more, may perform block matching for the object area of a size larger than 10×10, for example, blocks of the object region with respect to block matching region having a size of 20×20. In this case, block matching area may be expressed by specific coordinates within a frame of pixels. The extension of the block matching area corresponding to the movement speed of the object will be described below with reference to FIGS. 6A and 6B. On the other hand, for block matching with respect to the object area including the object, whether to reset the previously set area for searching motion vector may be determined according to the speed of movement of the object. Here, the block matching, as described above, is a part of a process for searching for a motion vector. Thus, the preset area for searching the motion vector may be used interchangeably with the preset area for block matching.

In other words, as described above, the processor 120, when a motion speed of the object is greater than the preset speed, may expand and reset the preset area for searching the motion vector.

Here, the preset speed of the movement of the object is a value preset in the system, and the value may be determined based on probability that a block matching error may occur.

For example, in the case where the movement speed of the object is great, when performing block matching by setting the size of the block matching area to be same size as the general case of the block matching, movement speed of the object is rapid and thus ratio of the object in block matching area is relatively small. Consequently, probability that block matching error would occur may be relatively high.

Accordingly, in order to minimize error occurrence probability according to speed of a movement of an object, for the case where speed of a movement of an object is greater than a predetermined speed, block matching can be performed for a block matching area of which size is greater than a size of a block matching area of a general case.

Figure 6A:
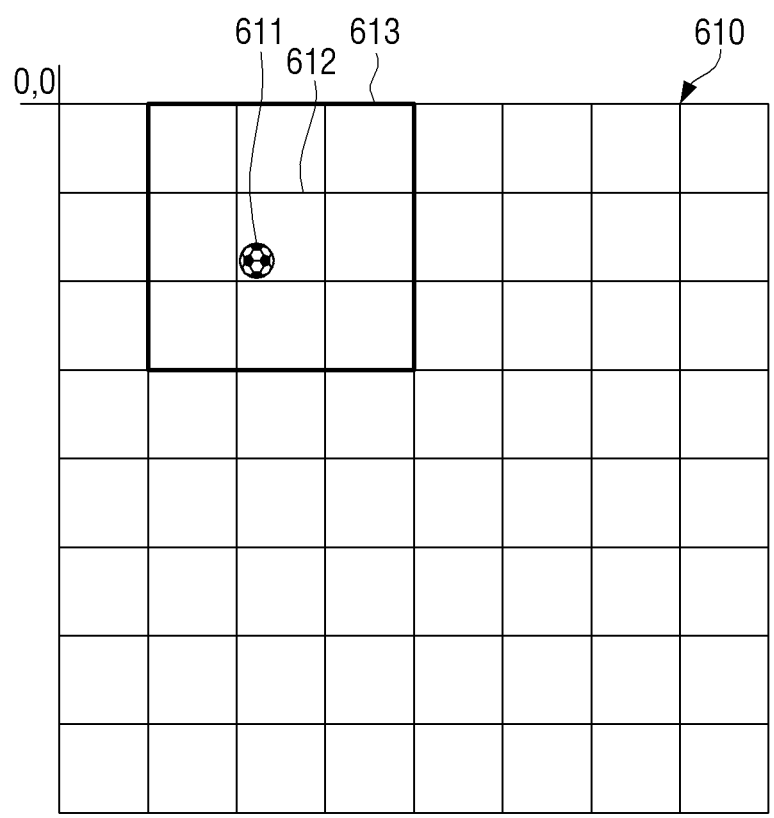
FIGS. 6A and 6B are views to describe interpolating according to another exemplary embodiment.
Figure 6B:
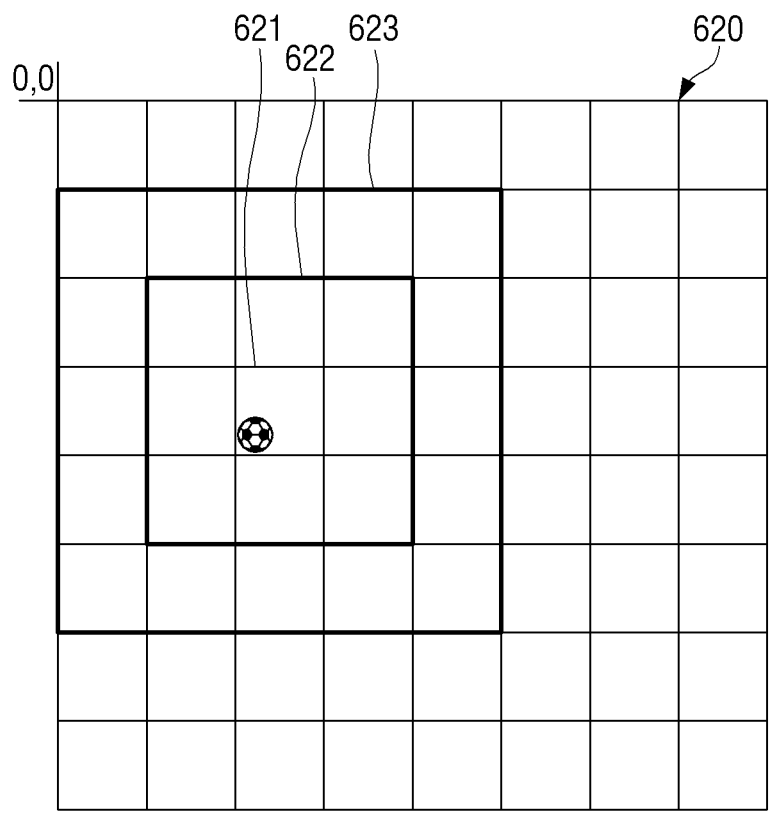

FIGS. 6A and 6B are views to describe interpolating according to another exemplary embodiment.

In FIGS. 6A and 6B, the previous frame 610 is a frame adjacent to the current frame 620. In the meantime, it is assumed that the object 611 is located in the first block 612 of the previous frame 610 and the second block 621 of the current frame 620. First of all, the processor 120 determines speed of the object 611.

Specifically, the processor 120 may determine speed of the object based on a position of the object in the current frame 620 and a position of the object in the previous frame 610.

Referring to FIGS. 6A and 6B, the processor 120 may calculate speed of a movement of the object using a difference between the central coordinate of the object 611 of the previous frame 610 and the central coordinate of the object 611 of the current frame 620.

For example, the processor 120 may determine, as speed of movement, a difference between the central coordinate of the object 611 of the previous frame 610 and the central coordinate of the object 611 of the current frame 620 by the difference between the reproduction time of the previous frame 610 and the reproduction time of the current frame 620.

As another example, the processor 120 may determine, as speed of movement, a difference value of the central coordinate of the object 611 of the previous frame 610 and the central coordinate of the object 611 of the current frame 620, since difference of reproducing time between frames is constant.

When speed of the object 611 is determined, the processor 120 compares the speed with a preset movement speed of the object 611 to determine whether or not to expand the block matching area.

For example, as illustrated in FIG. 6B, when it seems that speed of the object 611 is greater than the preset movement speed of the object 611, the processor 120 may perform block matching, in the frame adjacent to the current frame 620, from the first block matching area 622 to the second block matching area 623.

Here, the first block matching area 622 is a preset block matching area for general interpolating in the frame rate conversion apparatus 100. For example, in case of block matching with respect to a block adjacent to the previous frame 610 with respect to a block of the previous frame 610, block matching area 613 having the same size as the first block matching area 622 is applied.

In addition, the second block matching area 623 may be determined adaptively based on speed of a movement of the object 611. For example, according to degree of increase in speed of movement of the object 611, the second block matching area 623 can increase as much as n times of a size of the first block matching area 622.

In the meantime, size and speed of the object are considered together, size of a block for movement estimation and size of a block matching area for searching motion vector can be adjusted.

For example, the processor 120, when a size of the object is less than a preset size, and speed of a movement of an object is greater than a preset speed, can perform motion estimation by adjusting at least one of a size of a block for estimating a motion or a size of a block matching area.

In the meantime, the processor 120, when a size of the object is less than a preset size, may set strength of filtering to equalize a motion vector of the set object to be less than a preset strength to perform interpolating. Herein, description that overlaps with what has been described above for speed of the movement of the object will be omitted.

Here, the filtering for equalizing the motion vector is a process of leveling sizes of each of the motion vector which is determined by performing motion estimation. As an example, low pass filter (LPF) as a filter for filtering may be used. In this case, the filtering strength can be preset in accordance with the characteristics of the image, characteristics of a display device, or the like. The predetermined filtering strength is a filtering strength of a preset motion vector for interpolating set in the frame rate conversion apparatus 100.

That is, the processor 120, when a size of the object is less than a preset size, may adjust a preset filtering strength to be less than a preset strength to equalize the motion vector and generate an interpolation frame using a motion vector filtered according to the adjusted filtering strength. Accordingly, the processor 120 may perform interpolating to which an actual movement of an object is reflected by limiting filtering of a motion vector corresponding to an object having a small size.

On the other hand, the processor 120, for an object area which is in a pattern shape, may perform interpolating by setting a size of a block serving as a unit for performing interpolation to be greater than the preset size. Here, the processor 120, based on at least one of a direction of an edge included in the current frame and whether the edge is repeated, may determine whether an object is in a pattern shape. In this case, the edge is the outline of a specific shape of the object.

For example, for block matching with respect to an object area including the object, whether or not to perform block matching using a block of a size greater than other areas can be determined depending on whether the object is a pattern shape or not.

That is, as described above, when an object is a pattern shape, the processor 120 may perform matching using a block having a size greater than other areas.

For example, when most of the object that constitutes the frame is a pattern shape, when performing the block matching with blocks of the same size as the other areas of the specific object, most of the object constituting the frame have the same pattern, and thus, probability of errors in the block matching of the remaining areas except the area of the predetermined object area may be relatively high.

Accordingly, to minimize the error occurrence probability according to a shape of the object, block matching can be performed using the blocks of which size is set to be greater than a block of general block matching.

For interpolating when the object is in a pattern shape will be described with reference to FIG. 7.

Figure 7:
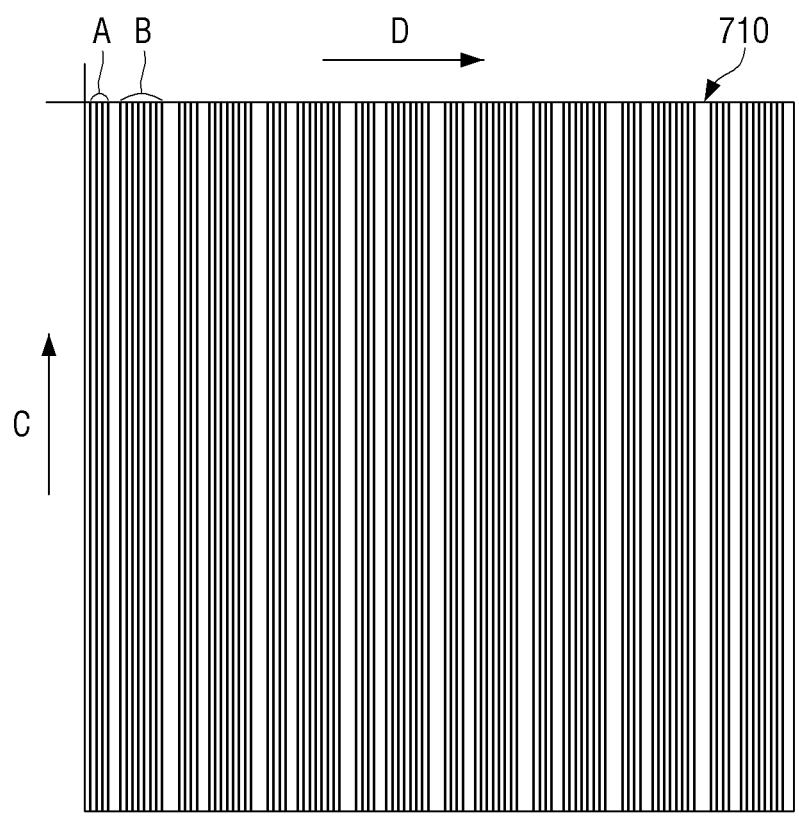
FIG. 7 is a view to describe interpolating according to still another exemplary embodiment.

FIG. 7 is a view to describe interpolating according to still another exemplary embodiment.

Referring to FIG. 7, the processor 120 determines whether the object A and the object B included in the current frame 710 is a pattern, and according to a result thereof, a size of a block serving as a unit of interpolating is adjusted.

For example, the processor 120 may determine edge of the object A and the object B which are repeated in a frame. In addition, the processor 120, based on the determined edge, may determine an edge direction of the object A and the object B (direction C) and a repetition direction of edge of the object A and the object B (direction D). Here, the processor 120, in a case of at least one of a case that the edge direction (direction C) is the same and a case where the edge repeats in the constant direction (direction D), determines an object having the corresponding edge as a pattern shape.

Here, a pattern shape can be a case where the object A and the object B are repeated alternately, and a case where one of the object A or the object B is repeated. In addition, the pattern shape can be a case where the object having difference directions of edge is repeated. That is, the processor 120, in a case where a specific object having an edge is repeated, may determine such repetition of the specific object as a pattern shape.

The processor 120, when it seems that the object is in a pattern shape, may perform motion estimation by expanding a size of a block for the motion estimation. Through this, errors of motion estimation with respect to the pattern shape included in the current frame 710 can be reduced.

In addition, the processor 120, when the object is in a pattern shape, may set strength of filtering to equalize a motion vector of the set object block to be greater than a preset strength to perform interpolating.

That is, the processor 120, when an object is in a pattern shape, may adjust a preset filtering strength to be great to equalize a motion vector, and generate an interpolation frame using a motion vector filtered according to an adjusted filtering strength. Accordingly, the processor 120, by strengthening filtering of the motion vector of a motion which corresponds to the object in a pattern shape, may perform interpolating to which degree of actual motion is reflected.

In addition, the processor 120, when an object is in a pattern shape, in an adjacent frame corresponding to the selected object block, may perform interpolating by setting such that a search area of a motion vector with respect to a block of the set object to be smaller than a preset area.

For example, when most of the object constituting a frame is in a pattern shape, if performing block matching for a specific object area including the object by applying a size of an ordinary block matching area, the objects existing in the frame have the same pattern, and thus, probability of error occurrence in block matching can be relatively higher.

Accordingly, in order to minimize error probability for block matching, in case of a frame including a pattern shape, block matching can be performed using a block matching area having a size smaller than a general block matching area.

In the meantime, the processor 120 may determine whether motion estimation with respect to an object inserted in a video constituting the current frame is available, and perform interpolating. Here, the inserted object may be artificial contents such as a logo and a script.

For example, the processor 120, when the current frame contains a semi-transparent logo, determines that it is impossible to estimate motion of a block containing the semi-transparent log, and generate a frame without performing motion estimation. For example, the processor 120, when motion estimation is not possible, may determine an average value of pixel values of pixels at the same position in the previous frame and the current frame as the pixel value in the same position of the interpolation frame, and generate an interpolation frame between the current frame and the previous frame. Or, the processor 120 may generate a frame which is the same as one of the current frame and the previous frame as an interpolation frame.

As another example, a logo of a broadcasting company is in a fixed position in all the video frames not in the current frame. For example, the processor 120, when a logo of a broadcasting company is located in a predetermined area of each frame, may not perform motion estimation for an area of the logo, and locate the logo on a specific area of all the frame constituting one video.

In the meantime, the processor 120 may perform interpolating based at least on one of a representative pixel value of an object, speed and a shape thereof. Here, interpolating based at least on one of size, speed, and shape of an object has been described above and will not be further described.

Specifically, the processor 120 may perform an interpolation process by using a representative pixel value of the object. Here, the representative pixel value is a pixel value most pixels have among the pixel values of the pixels constituting the object.

For example, if there is an object which has a small size and a faster movement, the processor 120 may apply the representative value as the pixel values of all the pixels constituting the object. Further, the processor 120 can apply the representative pixel value to the pixels constituting the objects proportionally. In this case, it is possible that ratio of the respective representative pixel value of the representative pixel values of the object to the pixel values of the pixels constituting the object is transferred from the video frame transmitter.

In the meantime, information of an object included in a plurality of frames constituting a video is metadata, which can be generated from a transmitter of a video frame and compressed along with a video data, or transmitted by using a channel different from the video data. For example, information regarding an object may be included in a Supplemental Enhancement Information (SEI) message and sent to a receiver of video data. Here, the SEI is mainly a message including information regarding an encoding start position of video data.

In addition, information of an object included in a plurality of frames constituting a video is metadata, which is generated from a video frame encoded in the receiver of the video data and provided to the frame rate conversion device 100.

The above-described information on the object generated in the transmitter and receiver of the video data includes various information for different interpolating in the object area. For example it may include a size of an object, a representative pixel value of an object, a type of an object shape (for example, when an object is in a pattern shape, an edge direction of a pattern, cycle of a pattern, a movement of a pattern area, etc.), movement information of an object (for example, block matching/search scope, speed of an object, a moving direction, etc.), whether a movement frame interpolating is available according to the characteristics of an object, whether a front face of an object is processed, and motion vector equalization strength of a block constituting an object, or the like.

Further, the metadata that contains information about the object may further include information about the area in which information about the object is applied. Here, information about the area in which information about the object is applied may be the information regarding the start and end frames among the plurality of frames (e.g., 240th frame of the video from the 48th frame of the video) and an area of the frame metadata including information about the object is applied (e.g., from the pixels (200, 300) to (400, 800) of the $48^{th}$ frame).

Such information about the object may be generated by analyzing the video frame (e.g., areas including subtitles, logos, noise, pattern, etc.) to determine the type of the object, performing motion estimation of the object, and conducting a process of quantifying the generated information in units of a frame unit or a scene. In this case, image analysis techniques such as edge detection, image segmentation, histogram analysis, block matching, optical flow, the entire motion estimation may be used.

It is described that the above-described information of an object is provided from a video data transmitter or a video data receiver, but the processor 120 may generate information about an object using an encoded video frame and perform interpolating using the above.

According to the above-described various exemplary embodiments, based on the characteristics of an object included in a video frame, by applying different interpolating, the optimal frame interpolating can be performed. Accordingly, image quality decline can be substantially reduced.

Figure 8:
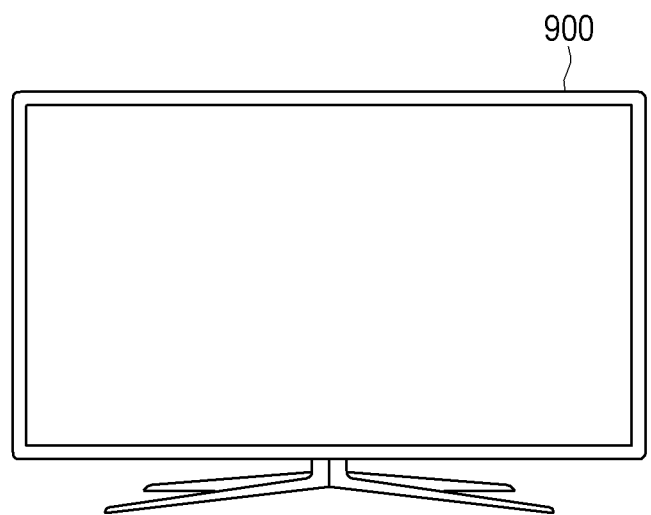
FIG. 8 is a view which illustrates a display apparatus according to an exemplary embodiment.

FIG. 8 illustrates a display apparatus 900 according to an exemplary embodiment.

Referring to FIG. 8, a TV is illustrated as an example of the display apparatus 900. The TV 900 includes the frame rate conversion apparatus 100. Therefore, the TV 900 may determine noise strength of a block of an image frame to estimate a motion vector of a block of an interpolation frame inserted between the image frame and a frame adjacent to the image frame. This will now be described in detail with reference to FIG. 9.

Figure 9:
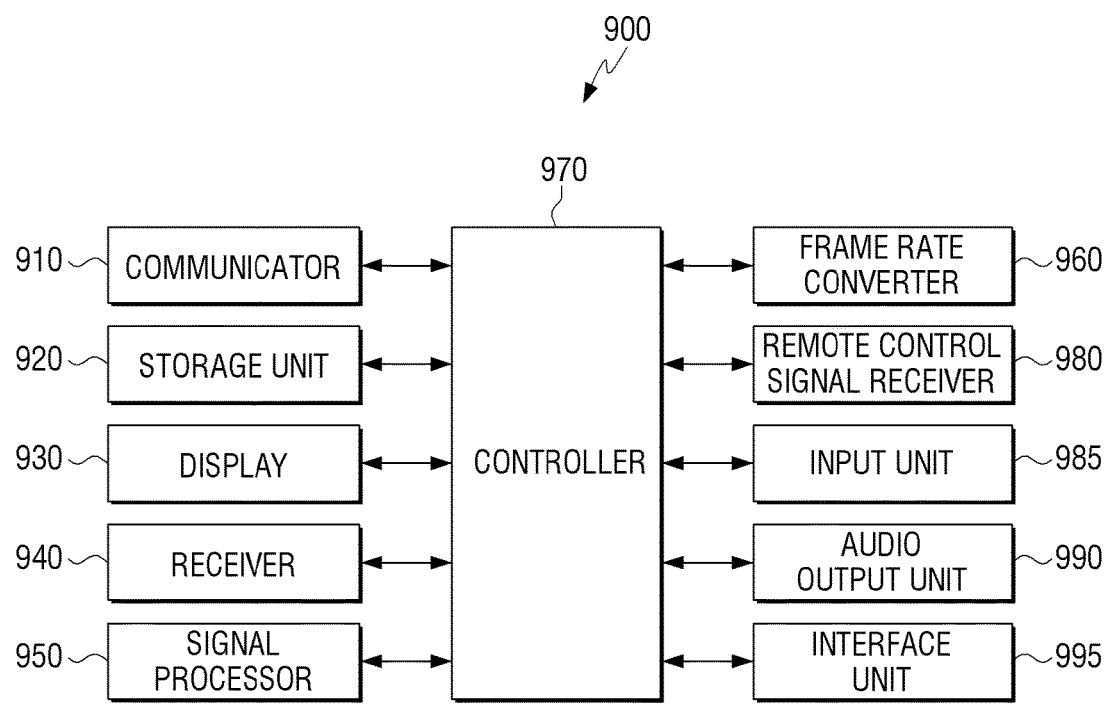
FIG. 9 illustrates a detailed configuration of a display apparatus according to an exemplary embodiment.

FIG. 9 is a block diagram of a detailed configuration of a display apparatus 900 according to an exemplary embodiment.

Referring to FIG. 9, the display apparatus 900 includes a communicator 910, a storage unit 920, a display 930, a receiver 940, a signal processor 950, a frame rate converter 960, a controller 970, a remote control signal receiver 980, an input unit 985, an audio output unit 990, and an interface unit 995.

The communicator 910 performs communications through a network (i.e., a communication network). In detail, for network communications, the communicator 910 may perform communications with various types of external apparatuses (e.g., another apparatus, server, etc.) connected to the network by using a network address allocated to the display apparatus 900.

Here, the network address may be an Internet Protocol (IP) address. In other words, the communicator 910 may perform a communication with another external apparatus (not shown) connected to an internet network by using the IP address.

The communicator 910 may perform a network communication by using various types of communication methods.

In detail, the communicator 910 may perform the network communication by using various types of communication methods such as a Wired/Wireless Local Area Network (WLAN), WiFi, a Wide Area Network (WAN), Ethernet, Bluetooth, Zigbee, a Universal Serial Bus (USB), IEEE 1394, etc. For this, the communicator 910 may include various types of communication modules for performing network communications according to communication methods. For example, if the communicator 910 performs a communication according to a wired LAN method, the communicator 910 may include a wired LAN card (not shown). If the communicator 910 performs a communication according to a WiFi method, the communicator 910 may include a WiFi chip (not shown).

The storage unit 920 stores various types of data and an operating system (O/S) for driving and controlling the display apparatus 900.

The storage unit 920 also stores a basic program that may be executed in the display apparatus 900. Here, the basic program may be an application program necessary for providing a basic function (or a basic service) of the display apparatus 900.

In detail, the basic program is an application program that is first installed in the display apparatus 900 by a manufacturer when manufacturing the display apparatus 900, i.e., is an application program that may not be arbitrarily deleted by a user of the display apparatus 900.

For example, if the manufacturer of the display apparatus 900 provides a content search function, a content play function, a search function for various types of application programs installed in the display apparatus 900, an Internet access function, and a setting function as basic functions, the storage unit 920 may store a basic program that may provide a corresponding basic function.

The storage unit 920 may also store a download program that may be executed in the display apparatus 900. Here, the download program may be an application program necessary for providing a basic function and an additional function (or an additional service) through the display apparatus 900.

In detail, the download program refers to an application program that may be arbitrarily installed in or deleted from the display apparatus 900 by the user differently from a basic program.

For example, the user may download a download program, which may provide an additional function such as a game function, a chatting function, or the like, from an external apparatus (not shown) and install the download program in the display apparatus 900, and the storage unit 920 may store the download program that may provide the corresponding additional function.

For this, the storage unit 920 may be realized as a storage medium such as a non-volatile memory (e.g., a flash memory), an Electrically Erasable Read Only Memory (EEROM), a hard disk, or the like.

The storage unit 920 may store the basic program and the download program in separate areas. In detail, the storage unit 920 may divide a storage area of a storage medium into a plurality of storage areas and store the basic program and the download program in different areas. For example, if the storage unit 920 is realized as a flash memory, the storage unit 920 may store the basic program in a first storage area of the flash memory and the download program in a second storage area of the flash memory. In this case, a storage area for storing the basic program may be a storage area that may not be arbitrarily accessed by the user, and a storage area for storing the download program may be a storage area that may be accessed by the user. In other words, the user may not delete the basic program stored in the storage area for storing the basic program but may delete the download program stored in the storage area for storing the download program.

Various types of data and the O/S for driving and controlling the display apparatus 900 may be stored together in the storage area storing the basic program and may be referred to as firmware.

However, this is only an exemplary embodiment, and thus the storage unit 920 may store the basic program and the download program in different storage media. In other words, if the storage unit 920 is realized as a plurality of flash memories, the basic program may be stored in a first flash memory, and the download program may be stored in a second flash memory.

The storage unit 920 may store a plurality of frames forming an image. The frame rate converter 970 that will be described later may perform interpolating using information related to an object included in an image frame stored in the storage unit 920.

The display 930 displays various types of screens. In detail, the display 930 may display a menu for executing the basic program. Here, the menu may include a menu item for executing the basic program that may provide the basic function of the display apparatus 900.

For this, the display 930 may be realized as a Liquid Crystal Display (LCD), an Organic Light Emitting Diode (OLED), a Plasma Display Panel (PDP), or the like.

The receiver 940 may receive a broadcast content (or a broadcast signal). The broadcast content may include an image, audio, and additional data (e.g., Electronic Program Guide (EPG)), and the receiver 940 may receive a broadcast content from various types of sources such as terrestrial broadcasting, cable broadcasting, satellite broadcasting, Internet broadcasting, etc. For example, the receiver 940 may receive a video stream that is acquired by coding a broadcast content image.

Here, the receiver 940 may be realized as a form, including elements such as a tuner (not shown), a demodulator (not shown), an equalizer (not shown), etc., to receive a broadcast content from a broadcasting station.

The signal processor 950 performs signal-processing with respect to a content received through the receiver 940. In detail, the signal processor 950 may perform an operation, such as decoding, scaling, frame rate conversion, or the like, with respect to an image forming the content, to signal-process the image in a form that may be output from the display 930. The signal processor 950 may also perform signal-processing, such as decoding or the like, with respect to audio forming the content to signal-process the audio in a form that may be output from the audio output unit 990.

The frame rate converter 960 may convert a frame rate. By using object information included in a video frame stored in the storage 920, interpolating which is different from the remaining areas other than the object area can be performed. Such interpolating has been described and will not be further detailed. The frame rate converter 960 may have a different name from the frame rate conversion apparatus 100 described above but may be the same element as the frame rate conversion apparatus 100.

Here, the frame rate converter 960 may be realized as a chip including the memory 110 and the processor 120 described above but is not limited thereto. Also, the frame rate converter 960 may not include the memory 110. In this case, the frame rate converter 960 may store and load an image frame by using the storage unit 920 instead of the memory 110.

The controller 970 controls an overall operation of the display apparatus 900. The controller 970 may include a Central Processing Unit (CPU) (not shown), an ROM (not shown), and a Random Access Memory (RAM) (not shown) for an operation of the display apparatus 900.

The ROM stores a command set, etc. for booting a system. If power is supplied through an input of a turn-on command, the CPU copies the O/S stored in the storage unit 920 into the RAM according to a command stored in the ROM and executes the O/S to boot the system. If the system is completely booted, the CPU copies various types of application programs stored in the storage unit 920 into the RAM and executes the application programs copied into the RAM to perform various types of operations.

The CPU accesses the storage unit 920 to perform booting by using the O/S stored in the storage unit 920. The CPU also performs various types of operations by using various types of programs, contents, data, etc. stored in the storage unit 920.

The remote control signal receiver 980 receives a remote control signal input from a remote controller (not shown).

For example, the remote control signal receiver 980 may receive a remote control signal for turning on the display apparatus 900 or displaying a menu. If the remote control signal for turning on the display apparatus 900 or displaying the menu is received, the controller 970 may display a menu for executing the basic program. Here, the controller 970 may differentially configure and display the menu according to a location of the display apparatus 900.

Besides this, the remote control signal receiver 980 may receive various types of remote control signals. For example, the remote control signal receiver 980 may receive a remote control signal for performing a channel change, a volume control, or the like, and the controller 970 may change a channel of the display apparatus 900 or control a volume of the display apparatus 900 according to the received remote control signal.

The input unit 985 receives various types of user commands. The controller 970 may execute a function corresponding to a user command input from the input unit 985.

For example, if a user command for turning on the display apparatus 900 or a user command for displaying the menu is input through the input unit 985, the controller 970 may display a menu for executing the basic program. In this case, the controller 970 may differentially configure and display the menu according to a location of the display apparatus 900.

Besides this, the input unit 985 may receive a user command for performing a channel change, a volume control, or the like, and the controller 970 may change a channel or control a volume according to the user command.

The audio output unit 990 may convert an audio signal output from the signal processor 950 into a sound and output the sound through a speaker (not shown) or output the sound to an external apparatus connected through an external output port (not shown).

The interface unit 995 connects various types of other apparatuses (not shown) to the display apparatus 900. The interface unit 995 may also transmit a content, etc. pre-stored in the display apparatus 900 to another apparatus (not shown) or may receive a content, etc. from the another apparatus.

For this, the interface unit 995 may include at least one selected from a High-Definition Multimedia Interface (HDMI) input port, a component input port, a PC input port, and a USB input port.

Figure 10:
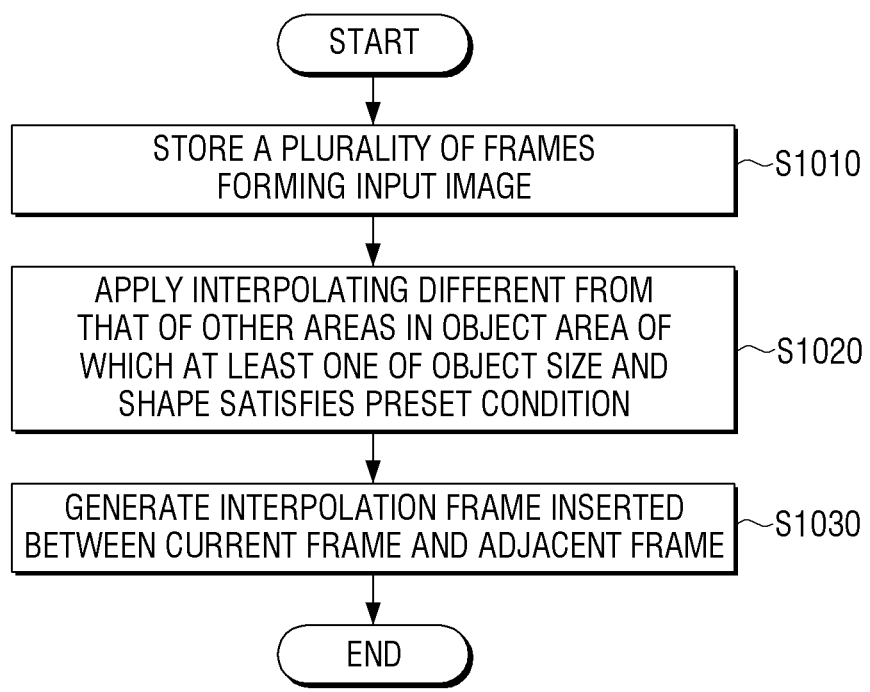
FIG. 10 is a flowchart of a frame conversion method of a frame conversion apparatus, according to an exemplary embodiment.

FIG. 10 is a flowchart of a frame rate conversion method of the frame rate conversion apparatus 100, according to an exemplary embodiment.

First of all, the frame conversion method includes storing a plurality of frames forming an input image (operation S1010), applying, to an object area of which at least one of a size, speed, and shape of an object included in a current frame among the plurality of frames, interpolating which is different from the interpolating applied to the rest of the areas (operation S1020), and generating an interpolation frame which is inserted between the current frame and an adjacent frame (operation S1030).

The interpolating, with respect to an object area of which a size of the object is less than a preset size, may be performed by setting that a size of a block for estimating a movement is to be less than a preset size.

The interpolating may be performed, when a movement of the object is greater than a preset speed, in the adjacent frame, by setting that a search area of a motion vector with respect to a block of the set object is to be greater than a preset area.

In addition, the interpolating may be performed, when a size of the object is less than a preset size, by setting strength of filtering to equalize a motion vector of a block of the object to be less than a preset strength.

The interpolating may be performed, with respect to an object area where the object is in a pattern shape, by setting such that a size of a block which is a unit performing interpolating is to be greater than a preset size.

The method may further include determining, based at least on one of a direction of an edge included in the current frame or whether an edge is repeated, whether the object is in a pattern shape.

The interpolating may include, when the object is in a pattern shape, interpolating by setting strength of filtering to equalize a motion vector of a block of the set object to be greater than a preset strength.

The interpolating may include, in the adjacent frame, interpolating by setting such that a search area of a motion vector with respect to a block of the set object is less than a preset area.

The interpolating may include performing the interpolating by determining whether estimation of a movement of the object inserted in a video constituting the current frame is available.

The interpolating may include performing the interpolating based at least on one of a representative value of the object, a size of the object, speed of the object, and a shape of the object.

A frame rate conversion method of the frame rate conversion apparatus 100 according to various exemplary embodiments of the present invention described above may be embodied as a computer executable program code and then stored on a non-transitory computer-readable medium to be provided to each server or devices so as to be executed by the processor 120.

There may be provided a non-transitory computer-readable medium that stores a program performing storing a plurality of frames forming an input image, applying interpolating different from remaining areas other than the object area which satisfies a preset condition of at least one of a size of an object, speed, and shape of an object included in the current frame among a plurality of frames, and generating an interpolation frame inserted between a current frame and an adjacent frame.

The non-transitory computer-readable medium is a medium which does not store data temporarily such as a register, cash, and memory but stores data semi-permanently and is readable by devices. More specifically, the aforementioned applications or programs may be stored in the non-transitory computer-readable media such as compact disks (CDs), digital video disks (DVDs), hard disks, Blu-ray disks, universal serial buses (USBs), memory cards, and read-only memory (ROM).

Although a few exemplary embodiments have been shown and described, it will be appreciated by those skilled in the art that changes may be made in the exemplary embodiments without departing from the principles and spirit of the disclosure.

What is claimed is:

1. A frame rate conversion apparatus comprising:
a memory configured to store a plurality of frames comprising a current frame and an adjacent frame, the current frame and the adjacent frame respectively comprising an object; and
a processor configured to:
determine a size of a block according to at least one of a size, a speed and a shape of the object, divide the current frame and the adjacent frame into a plurality of blocks based on the determined size,
generate an interpolation frame by performing an interpolation based on the divided current frame and the divided adjacent frame, and
insert the interpolation frame between the current frame and the adjacent frame.

2. The frame rate conversion apparatus of claim 1, wherein the processor is configured to perform the interpolation by setting a block size for a movement estimation to be less than a certain block size, when the size of the object is less than a certain size.

3. The frame rate conversion apparatus of claim 2, wherein the processor is configured to set, in the adjacent frame, a search area of a motion vector with respect to a block of the object to be greater than a certain area, when a movement of the object is greater than a certain speed, and perform the interpolation.

4. The frame rate conversion apparatus of claim 2, wherein the processor is configured to perform the interpolation by setting a degree of filtering to equalize a motion vector of a block of the object to be less than a certain degree, when the size of the object is less than the certain size.

5. The frame rate conversion apparatus of claim 1, wherein the processor is configured to perform the interpolation by setting a size of a block, which is a unit for performing the interpolation, is to be greater than a certain block size, when the object area includes the object which is in a pattern shape.

6. The frame rate conversion apparatus of claim 5, wherein the processor is configured to determine whether the object is in the pattern shape, based on at least one among a direction of an edge included in the current frame and whether an edge is repeated.

7. The frame rate conversion apparatus of claim 5, wherein the processor is configured to perform the interpolation by setting a degree of filtering to equalize a motion vector of a block of the object to be greater than a certain degree, when the object is in the pattern shape.

8. The frame rate conversion apparatus of claim 5, wherein the processor is configured to set, in the adjacent frame, a search area of a motion vector with respect to a block of the object to be less than a certain area, and perform the interpolation.

9. The frame rate conversion apparatus of claim 1, wherein the processor is configured to perform the interpolation by determining whether an estimation of a movement of the object inserted in a video constituting the current frame is available.

10. The frame rate conversion apparatus of claim 1, wherein the processor is configured to perform the interpolation based on at least one among a representative value of the object, a size of the object, a speed of the object, and a shape of the object.

11. A frame rate conversion method comprising:
storing a plurality of frames comprising a current frame and an adjacent frame, the current frame and the adjacent frame respectively comprising an object;
determining a size of a block according to at least one of a size, a speed and a shape of the object;
dividing the current frame and the adjacent frame into a plurality of blocks based on the determined size;
generating an interpolation frame by performing an interpolation based on the divided current frame and the divided adjacent frame; and
inserting the interpolation frame between the current frame and the adjacent frame.

12. The frame rate conversion method of claim 11, wherein the performing the interpolation includes performing the interpolation by setting a block size of a block for estimating a movement to be less than a certain block size, when the size of the object is less than a certain size.

13. The frame rate conversion method of claim 12, wherein the performing the interpolation includes performing the interpolation by setting, in the adjacent frame, a search area of a motion vector with respect to a block of the object to be greater than a certain area, when a movement of the object is greater than a certain speed.

14. The frame rate conversion method of claim 12, wherein the performing the interpolation includes performing the interpolation by setting a degree of filtering to equalize a motion vector of a block of the object to be less than a certain degree, when the size of the object is less than a certain size.

15. The frame rate conversion method of claim 11, wherein the performing the interpolation includes performing the interpolation by setting a size of a block, which is a unit for performing the interpolation, to be greater than a certain block size, when the object area includes the object in a pattern shape.

16. The frame rate conversion method of claim 15, further comprising:
determining whether the object is in the pattern shape, based on at least one among a direction of an edge included in the current frame and whether an edge is repeated.

17. The frame rate conversion method of claim 15, wherein the performing the interpolation includes interpolating by setting a degree of filtering to equalize a motion vector of a block of the object to be greater than a certain degree, when the object is in the pattern shape.

18. The frame rate conversion method of claim 15, wherein the performing the interpolation includes interpolating by setting, in the adjacent frame, a search area of a motion vector with respect to a block of the object to be less than a certain area.

19. The frame rate conversion method of claim 11, wherein the performing the interpolation comprises determining whether an estimation of a movement of the object inserted in a video constituting the current frame is available.

20. The frame rate conversion method of claim 11, wherein the performing the interpolation comprises performing the interpolation based on at least one among a representative value of the object, a size of the object, speed of the object, and a shape of the object.

* * * * *